(12) United States Patent
Wang

(10) Patent No.: US 9,246,611 B2
(45) Date of Patent: *Jan. 26, 2016

(54) LIVE EVENT AUGMENTATION

(71) Applicant: Anheuser-Busch InBev, New York, NY (US)

(72) Inventor: Winston Wang, San Francisco, CA (US)

(73) Assignee: Anheuser-Busch InBev, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/459,185

(22) Filed: Aug. 13, 2014

(65) Prior Publication Data

US 2014/0351866 A1    Nov. 27, 2014

Related U.S. Application Data

(63) Continuation of application No. 13/972,681, filed on Aug. 21, 2013, now Pat. No. 8,839,343.

(60) Provisional application No. 61/691,609, filed on Aug. 21, 2012, provisional application No. 61/691,617, filed on Aug. 21, 2012, provisional application No. 61/691,618, filed on Aug. 21, 2012, provisional application No. 61/691,622, filed on Aug. 21, 2012, provisional application No. 61/691,627, filed on Aug. 21, 2012, provisional application No. 61/691,630, filed on Aug. 21, 2012.

(51) Int. Cl.
| | |
|---|---|
| *H04N 7/16* | (2011.01) |
| *H04N 5/445* | (2011.01) |
| *H04H 20/63* | (2008.01) |
| *B67C 3/00* | (2006.01) |
| *H04L 29/08* | (2006.01) |
| *H04H 60/33* | (2008.01) |
| *B67D 7/34* | (2010.01) |
| *B67D 1/00* | (2006.01) |
| *B67D 1/08* | (2006.01) |

(Continued)

(52) U.S. Cl.
CPC ............... *H04H 20/63* (2013.01); *B67C 3/007* (2013.01); *B67D 1/0005* (2013.01); *B67D 1/0872* (2013.01); *B67D 7/348* (2013.01); *G07F 7/0609* (2013.01); *G07F 13/02* (2013.01); *G07F 13/025* (2013.01); *H04H 60/33* (2013.01); *H04L 67/22* (2013.01); *B67D 1/0888* (2013.01); *B67D 1/0894* (2013.01); *B67D 2001/0811* (2013.01); *B67D 2001/0812* (2013.01); *B67D 2210/00083* (2013.01); *B67D 2210/00089* (2013.01); *B67D 2210/00091* (2013.01)

(58) Field of Classification Search
CPC ............... H04N 21/44222; H04N 5/44543; H04N 21/4622; H04N 21/4126; H04N 21/812
USPC .................................. 725/10, 34, 40, 51, 153
See application file for complete search history.

(56) References Cited

U.S. PATENT DOCUMENTS 6,297,853 B1 *  10/2001  Sharir et al. ................... 348/589
7,444,659 B2 *  10/2008  Lemmons ....................... 725/34

(Continued)

*Primary Examiner* — Sumaiya A Chowdhury
(74) *Attorney, Agent, or Firm* — Holland & Hart LLP

(57) ABSTRACT

Systems, devices, and methods for live event augmentation are provided. A central server computer system detects intelligent beverage containers at an event. The beverage containers include an integrated electronic display. Extrinsic data is received during the course of the event that is used to generate a message. The message is transmitted to the beverage containers at the event to update the electronic display. The extrinsic data may be related to the event or to an activity occurring separate from the event. The electronic display of the beverage containers may be changed periodically during the event. The beverage containers may be divided into one or more groups based on information stored in a user account associated with each beverage container. Different messages can be sent to the different groups to display different information on the beverage containers of each group.

10 Claims, 11 Drawing Sheets

(51) Int. Cl.
   *G07F 7/06* (2006.01)
   *G07F 13/02* (2006.01)

(56) References Cited

U.S. PATENT DOCUMENTS

| | | |
|---|---|---|
| 8,341,669 B2 | 12/2012 | Lau et al. |
| 8,839,343 B2 | 9/2014 | Wang |
| 2010/0045705 A1* | 2/2010 | Vertegaal et al. ............ 345/661 |
| 2011/0292299 A1* | 12/2011 | Lau et al. ...................... 348/734 |
| 2012/0158531 A1* | 6/2012 | Dion et al. .................... 705/26.1 |
| 2014/0053944 A1 | 2/2014 | Wang |
| 2014/0059133 A1 | 2/2014 | Wang |
| 2014/0059581 A1 | 2/2014 | Wang |

\* cited by examiner

LIVE EVENT AUGMENTATION

CROSS-REFERENCE TO RELATED APPLICATION(S)

The present application is a continuation of U.S. patent application Ser. No. 13/972,681, filed on Aug. 21, 2013, entitled "LIVE EVENT AUGMENTATION USING AN INTELLIGENT BEVERAGE CONTAINER," which claims the benefit of and priority to U.S. Provisional Patent Application Ser. No. 61/691,609 entitled "BEVERAGE CONTAINER WITH INTEGRATED ELECTRONIC DISPLAY," filed Aug. 21, 2012; to U.S. Provisional Patent Application Ser. No. 61/691,617 entitled "BEVERAGE CONTAINER WITH DYNAMIC LABEL," filed Aug. 21, 2012; to U.S. Provisional Patent Application Ser. No. 61/691,618 entitled "STATE-BASED CONTAINER MANAGEMENT," filed Aug. 21, 2012; to U.S. Provisional Patent Application Ser. No. 61/691,622 entitled "SOCIAL ACTIVITIES USING INTELLIGENT BEVERAGE CONTAINERS," filed Aug. 21, 2012; to U.S. Provisional Patent Application Ser. No. 61/691,627 entitled "CENTRALLY COORDINATED SOCIAL ACTIVITIES USING INTELLIGENT BEVERAGE CONTAINERS," filed Aug. 21, 2012; and to U.S. Provisional Patent Application Ser. No. 61/691,630 entitled "ACCOUNT-BASED MANAGEMENT OF INTELLIGENT BEVERAGE CONTAINERS," filed Aug. 21, 2012; of which the entirety of each application is incorporated herein by reference.

BACKGROUND

The present invention relates to live event augmentation methods and system that use an intelligent beverage container to dynamically display graphics and text related to the event over the course of an event.

Beverage containers are ubiquitous. While some beverage containers (e.g., aluminum cans) are designed to be used once and then recycled, other types of beverage containers (e.g., glasses, chalices, bottles, etc.) may be refilled and reused many times. Nevertheless, the labels on most refillable beverage containers contain images or text permanently printed on a paper or plastic medium or permanent markings on the material of the beverage container itself. Thus, even though a beverage container may be refilled with multiple different beverages over the course of an event, no solution exists for dynamically updating the label of the beverage container.

Additionally, beverages are often consumed during events, e.g., sporting events, concerts, performances, public gatherings, etc. Currently, people at such events wishing to use their beverage containers to express emotion are limited to, for example, raising a bottle to express solidarity with a team. However, no solution exists for dynamically utilizing a beverage container to augment the event as activities occur in real time, e.g., to dynamically update the label of the beverage container during the event based, at least in part, on activities occurring during the course of the event.

SUMMARY

According to a first set of illustrative examples, a method is provided. The method may include: detecting a plurality of beverage containers at an event, each beverage container being associated with a user account; and displaying information related to the event on the beverage containers based on information stored in the user accounts. In some examples, the method may also include: dividing each of the beverage containers at the event into one or more groups based on information stored in the user accounts. Different information may be displayed on the beverage containers at the event for at least one of the groups. The event may be a sporting event between two teams and the method further includes: associating, based on information stored in the user accounts, one of the two teams with each user; and dividing, based on the determination, each of the beverage containers at the event into a first group that is associated with a first of the two teams and a second group that is associated with a second of the two teams.

In some examples, the method may also include: changing the displayed information on the beverage containers at the event on a recurring basis based on a predetermined time period. The displayed information on the beverage containers may be changed at the event based on an activity occurring at the event. Different information may be displayed on at least a portion of the beverage containers at the event. Information related to the event may be displayed on the beverage containers in different languages based on information stored in the user accounts associated with the beverage container.

In some examples, the method may include: initiating a prize giveaway in conjunction with the event; randomly selecting a beverage container detected at the event as a winner of the prize giveaway; and displaying information on the selected beverage container indicating that the user of the beverage container is the winner of the prize giveaway. Detecting the plurality of beverage containers at the event may include detecting a wireless signal from each of the beverage containers. The wireless signal may be transmitted via a wireless communications module in each of the beverage containers.

In a second set of illustrative examples, an apparatus for conducting live event augmentation is provided. The apparatus may include: a processor; a memory in electronic communication with the processor; and instructions being executable by the processor to, detect a plurality of beverage containers at an event, each beverage container being associated with a user account; and display information related to the event on the beverage containers based on information stored in the user accounts. The instructions may also be to divide each of the beverage containers at the event into one or more groups based on information stored in the user accounts. Different information may be displayed on the beverage containers at the event for at least one of the groups.

In some examples, the event may be a sporting event between at least two teams and further including instructions to: associate, based on information stored in the user accounts, one of the two teams with each user; and divide, based on the determination, each of the beverage containers at the event into a first group that is associated with a first of the two teams and a second group that is associated with a second of the two teams.

In a third set of illustrative examples, a central server computer system configured for live event augmentation is provided. The system may include: a dynamic messaging module configured to receive a first extrinsic data related to an event and generate a first message indicative of the first extrinsic data; a user profile data store configured to store user account information associated with each of a plurality of beverage containers detected an the event; a filtering module configured to, based on the user account information, determine which of the beverage containers at the event are to receive the message; and a broadcasting module configured to broadcast the first message to the determined beverage containers at the event. The system may also include a wireless module configured to detect the beverage containers at the event and communicate with the detected beverage containers.

In some examples, the dynamic messaging module may be further configured to receive a second extrinsic data related to the event and generate a second message indicative of the second extrinsic data; and wherein the filtering module is configured to determine, based on the second message and the user account information, determine that all of the detected beverage containers are to receive the second message.

In some examples, the user profile data store may be in operative communication with an online social network to retrieve the user account information. The filtering module may be configured to divide at least a portion of the beverage containers at the event into one or more groups based on user account information. The groups may be determined based on one or more of a language, a nationality, an age, a gender, a supported team, or a previous activity associated with a user of the beverage container. The user profile data store may be further configured to receive a registration request from a user of a beverage container, the registration request being used to create the user account. The registration request may include information indicative of an identification code associated with the beverage container of the user.

In some examples, the beverage containers include one or more of a bottle, a cup, a mug, a glass, a can, a pitcher, a tumbler, or a chalice.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
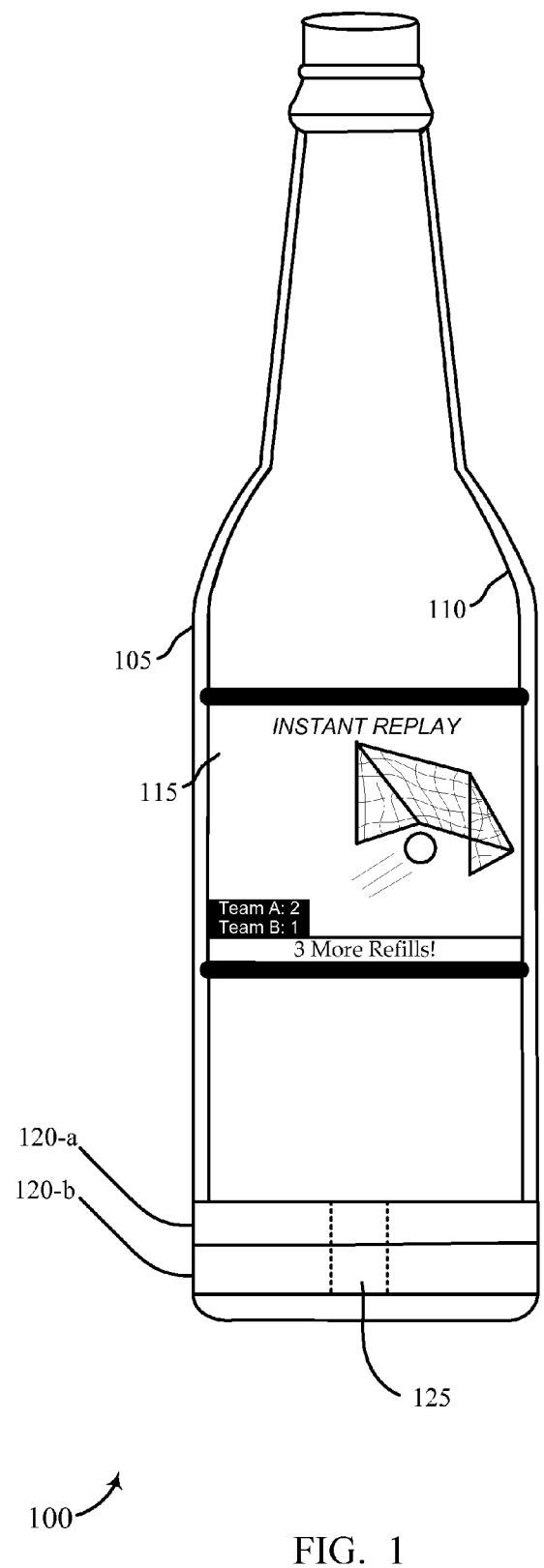
FIG. 1 is a diagram of an example beverage container with an integrated display according to various embodiments of the invention.

Methods, systems, and devices are disclosed for live event augmentation that utilize an intelligent beverage container. In one set of examples, communication may be established between a central server computer system and a plurality of intelligent beverage containers at the event. The beverage containers may each be in wireless communication with the central server computer system to exchange data, identification, or other information. The beverage containers may include a display that can be dynamically changed. Each of the beverage containers may be associated with a user account. The central server computer system may detect the beverage containers at the event and access data from the user accounts associated with the detected beverage containers. Based on activities occurring at the event and/or on data retrieved from the user accounts, an integrated display on the beverage containers can be updated dynamically during the course of the event.

According to certain examples, different information may be displayed on different ones of the beverage containers at the event. The central server computer system may filter data from the associated user accounts to determine one or more groups at the event. Based on this determination, when an activity occurs at the event that relates to a first group, the central server computer system may receive first extrinsic data related to the activity used to generate and transmit a first message to a first group of beverage containers. A second message may be generated and transmitted to a second group of beverage containers whose users are not associated with the activity. Based on the first and second messages, the beverage containers in the first group would have a different display than the beverage containers from the second group.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

As used herein, the terms "hot-swappable" generally refers to the characteristics of an electronic module as defined by the ability to quickly remove and replace the electronic module with little or no down time. By way of example only, an electronic module that is hot swappable may be inserted, added, removed, and the like, without requiring disrupting a power source and/or an associated module.

Systems, devices, methods, and software are described for live event augmentation using a central server computer system in communication with a plurality of beverage containers detected at the event.

FIG. 1 illustrates an example intelligent beverage container 100. In the example of FIG. 1, the beverage container 100 is a bottle. However, it should be understood that the principles of the present disclosure may also be applied to other types of beverage containers, including but not limited to glasses, cups, cans, mugs, pitchers, tumblers, chalices, and the like.

The intelligent beverage container 100 may include an outer surface 105 and an inner surface 110. The outer surface 105 may generally define the shape of the beverage container 100, and the inner surface 110 may define the area that holds the beverage. An electronic display 115 may be disposed between the outer surface 105 and the inner surface 110. Alternatively, the electronic display 115 may be disposed on the outer surface 105 of the beverage container 100. Generally, the electronic display 115 may sized and shaped so as to conform to at least a portion of the beverage container 100. The electronic display 115 may be shaped such that the display area of the electronic display 115 conforms to a curvature of the beverage container 100. When the electronic display 115 is disposed between the inner surface 110 and the outer surface 105, at least a portion of the outer surface 105 of the beverage container 100 may be transparent or translucent such that the electronic display 115 is visible from the outside of the beverage container 100.

In certain examples, the curved electronic display 115 may be a thin organic light-emitting diode (OLED) display formed on a flexible polymer or other substrate such that the display area of the electronic display 115 may be flexed according to the curvature of the circumference of the beverage container 100. However, it should be understood that the principles of the present disclosure may also be applied to other types of flexible electronic displays, including, but not limited to active matrix light-emitting diode (AMOLED), passive-matrix OLED, and the like. In certain examples, the curved electronic display 115 may be a 360 degree electronic display 115 such that the display area of the electronic display 115 forms a substantially continuous display area around the circumference of the beverage container 100.

Alternatively, or in addition to the electronic display 115, the beverage container 100 may also comprise one or more light sources (e.g., light-emitting diodes (LEDs)) positioned around the circumference and/or length of the beverage container 100. The light sources may be disposed between the inner surface 105 and the outer surface 110 of the beverage container. Each or some of the light sources may emit light at one or more colors.

In certain examples, the beverage container 100 may be a double-walled container in which a first wall forms the outer surface 105, a second wall forms the inner surface 110, and the curved electronic display 115 is disposed intermediate the first and second walls. The first and second walls may be made of the same or different materials. For example, in one embodiment the first and second walls may be made out of glass. In another example, the first wall may be made out of glass and the and second wall may be made out of plastic.

The beverage container 100 may further include one or more electronics module 120 configured to house control circuitry for the beverage container 100. For example, at least one electronics module 120 may include control circuitry for the curved electronic display 115. Additionally, at least one electronics module 120 may include one or more processors, memory, accelerometers, gyroscopes, wireless devices (e.g., Wireless Local Area Network (WLAN), Radio Frequency Identification (RFID), Near Field Communications (NFC), Global Positioning System (GPS)), or other input/output devices that may suit a particular application of the principles of the present disclosure. Using these electronic components in the electronic module(s) 120 coupled with the curved electronic display 115, a user of the beverage container 100 may interact with a computer network to enhance and augment the experience of consuming a beverage at an event.

In certain examples, one or more electronics module 120 of the beverage container 100 may be selectively removable and replaceable. For example, an electronics module 120 may house a battery or other power supply that may be selectively replaced to ensure substantially continuous up time for the curved electronic display 115. Additionally or alternatively, an electronics module 120 may house electronic memory that may be selectively replaced when the electronic memory is filled with data. In certain examples one or more of the electronics module 120 may be hot-swappable such that the curved electronic display 115 or other electronic components of the beverage container 100 remain on for all or substantially all of the time during the replacement of the module(s) 120.

In certain examples, the beverage container 100 may include a refill conduit 125 configured to interface with a refill station and refill the beverage container 100. In certain examples, electronics module 120 may be shaped such that the refill conduit 125 passes through the electronics module 120.

While the beverage container 100 shown in FIG. 1 may contain a number of integrated electronic module(s) 120, it will be understood that in certain examples at least some of the electronic functionality of the beverage container 100 shown in FIG. 1 may be implemented in a separate device. For example, one or more of the electronics module 120 may be implemented in a mobile phone or other device that wirelessly communicates with the beverage container 100 to control the curved electronic display 115 or another aspect of the beverage container 100. Additionally or alternatively, a special-purpose device may be provided separately from the beverage container such that the special-purpose device contains one or more of the electronics module 120 and communicates with the beverage container 100 to control the curved electronic display 115 or another aspect of the beverage container 100.

The present disclosure describes various embodiments of beverage containers 100 configured to perform a number of different functions. However, in light of the foregoing description, it will be understood that a functionality described herein as being performed by the beverage container 100 may, in other embodiments, be performed by a device or module external to the beverage container 100. Such a device or module may communicate with the beverage container 100 to achieve the same or a similar effect as the beverage container 100 performing that functionality.

In certain examples, the integrated curved electronic display and other electronic components of the beverage container 100 may enable a user of the beverage container 100 to participate in live event augmentation managed by a central server computer system. For example, a central server computer system may communicate with the number of beverage containers 100 to implement a variety of activities related to a live event. The central server computer system may receive input from the beverage containers 100, from a user account associated with the beverage container, etc., and control the beverage containers 100 to display certain images or text in response and during the course of an event.

According to certain embodiments, a central server computer system may detect beverage containers 100 at an event in a variety of ways. In some examples, the beverage containers 100 may comprise a GPS and a wireless device in the electronics module 120. The beverage containers 100 may communicate location data via the wireless device to the central server computer system such that the beverage containers 100 are detected at the event. According to some examples, the central server computer system may comprise a wireless network in proximity to the event. As beverage containers 100 arrive at the event and connect to the wireless network, the central server computer system may detect the beverage containers 100 at the event based on the connection being established. According to even further examples, the beverage containers 100 may comprise a RFID module and a wireless receiver module in the electronics module 120. As a user of the beverage container enters an event, an RFID reader positioned near the entrance to the event (e.g., at a turnstile, gate, etc.) may read the RFID module from the beverage containers 100 and register the beverage container 100 with the central server computer system. Subsequently, the central server computer system may communicate one or more messages to the beverage containers 100 to cause the information being displayed on the electronic display 115 to change.

Once detected at the event, the central server computer system may transmit messages to the beverage containers 100 to update or change the information being displayed on the electronic display 115. The central server computer system may change the information displayed on the electronic displays 115 of the beverage containers 100 in real time (i.e., as activities occur during the course of the event). For example, the central server computer system may, at a sporting event, transmit one or more messages to each of the beverage containers 100 to cause the electronic display 115 to show information about the current status of the sporting event such as the score, the period/quarter/time, possession, fouls, penalties, etc. As shown in FIG. 1, the central server computer system may additionally, or alternatively, cause the electronic displays 115 to display when a team scores. As another example, the central server computer system may, at a concert event, transmit one or more messages to each of the beverage containers 100 to cause the electronic display 115 to show information related to a song (e.g., title, year released, the song lyrics, etc.), information related to the band or band members, upcoming concert dates, etc. In some examples, the central server computer system may cause the electronic displays 115 to display a solid color where the color can be changed based on event activities. As can be appreciated, the central server computer system may change the information being shown on the beverage containers based on a wide variety of event types as well as specific activities occurring at the event. In certain examples, the central server computer system may cause the information being displayed on the electronic display 115 to change on a recurring or periodic basis.

Figure 2:
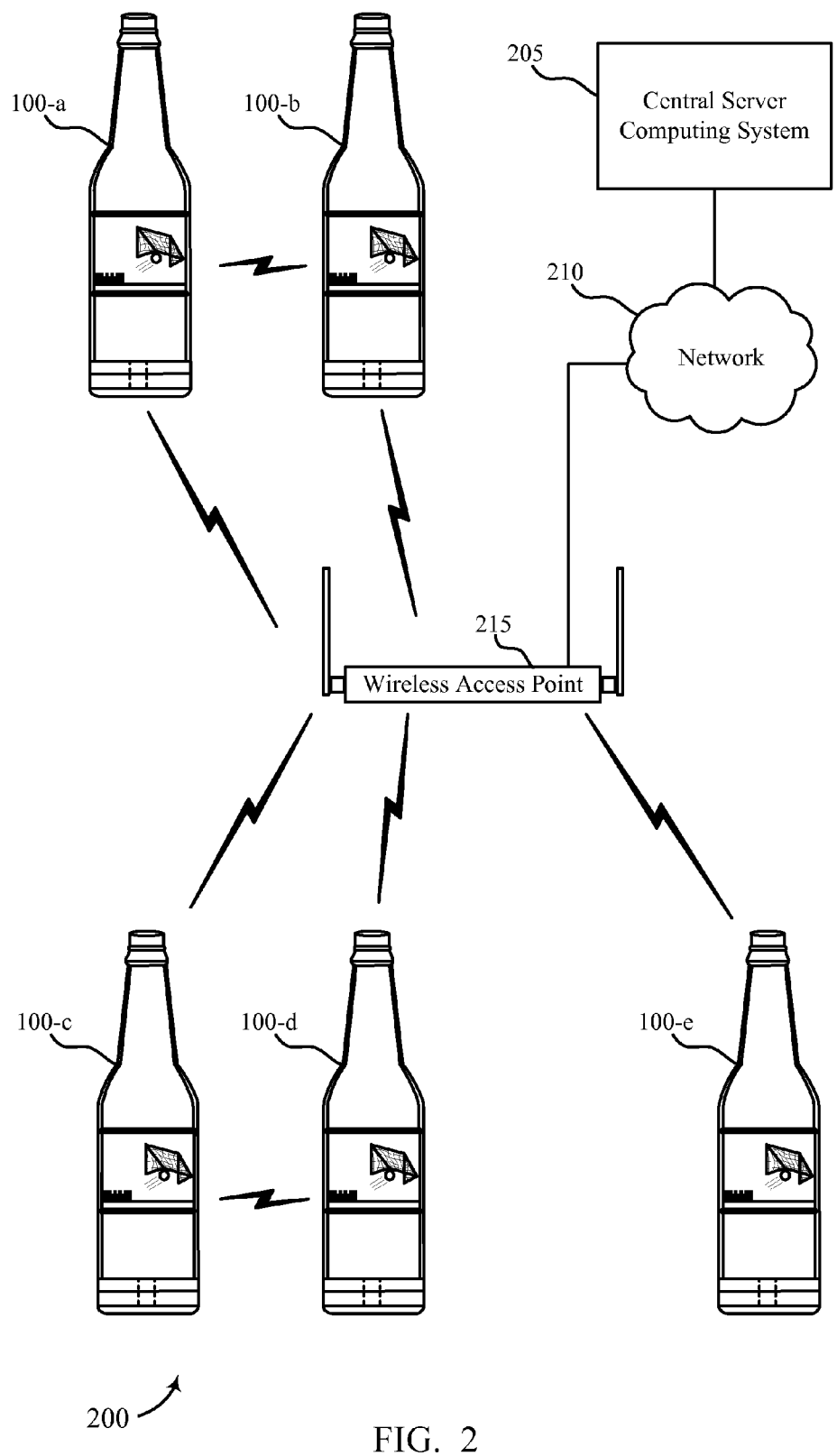
FIG. 2 is a diagram illustrating an example system for communicating with intelligent beverage containers according to various embodiments of the invention.

FIG. 2 is a block diagram of an example system 200 in which a number of intelligent beverage containers 100 may communicate with a central server computer system 205 over network 210 and one or more wireless access points 215. The system 200 may be used to enable communication between beverage containers 100 and allow the central server computer system 205 to implement live event augmentation activities among users of different beverage containers 100 based on communication with the beverage containers 100. In the illustrative example shown in FIG. 2, the system 200 may be used to allow the central server computer system 205 to change the information being displayed on the beverage containers 100 based on real-time activities occurring at the event (e.g., based on a team scoring a goal).

The beverage containers 100 may each have a WLAN transceiver that can establish a Wi-Fi connection to the wireless access point 215. The wireless access point 215 may enable the beverage containers 100 to communicate with each other and with the central server computer system 205 over the network 210. The central server computer system 205 may coordinate interactions and activities between the users of the beverage containers 100. To coordinate these interactions and activities, the central server computer system 205 may communicate with the individual beverage containers 100 to control the respective electronic displays 115 integrated into each beverage container 100 and display information related to the event.

In certain examples, the central server computer system 205 may receive input from the beverage containers 100, including location input, proximity to other beverage containers 100, gestures measured by gyroscopes, and the like. The central server computer system 205 may respond to such input based on one or more rules associated with a live event augmentation for one or more of the beverage containers 100. Additionally or alternatively, the central server computer system 205 may respond to extrinsic input inferred or received from a source other than the beverage containers 100. Such a response may include displaying special messages on the electronic displays of one or more beverage containers 100, awarding refill or other incentives to users associated with specific beverage containers, or other relevant action.

In certain examples, the individual beverage containers 100 may communicate with each other without going through the wireless access point 215 or the network 210. For example, beverage containers 100-a and 100-b may communicate directly with each other over an ad-hoc WiFi connection, a Bluetooth connection, an NFC connection, or another type of wireless connection. In certain examples, the beverage containers 100 may be programmed to exchange data or implement live event augmentation activities on an ad-hoc basis without connection to a central network 210 or server computer system 205.

Figure 3:
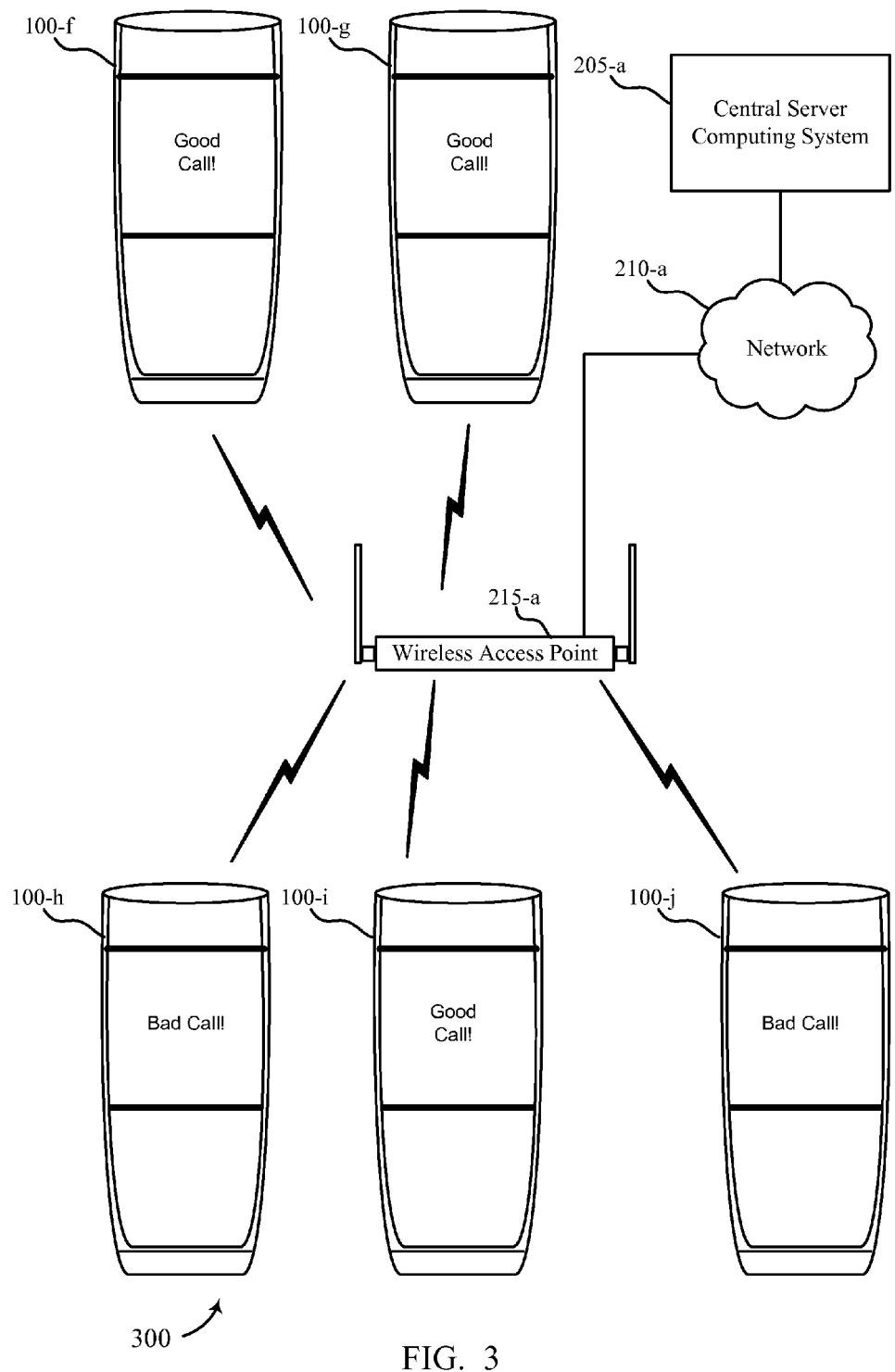
FIG. 3 is a diagram illustrating an example centrally coordinated live event augmentation system communicating with intelligent beverage containers according to various embodiments of the invention.

FIG. 3 is a block diagram of an example system 300 in which a plurality of intelligent beverage containers 100 may communicate with a central server computer system 205-a over network 210-a and one or more wireless access points 215-a. The system 300 may implement aspects of the system 200 discussed above with reference to FIG. 2. The system 300 may be used to enable communication between beverage containers 100 and allow the central server computer system 205-a to implement live event augmentation activities among users of different beverage containers 100 based on communication with the beverage containers 100 and upon information retrieved from a user account associated with each beverage container 100. In the illustrative example shown in FIG. 3, the system 300 may be used to allow the central server computer system 205-a to change the information being displayed on the beverage containers 100 based on real-time activities occurring at the event (e.g., based on a first team receiving a penalty) and also based upon information from a user account associated with each of the beverage containers 100.

The beverage containers 100 may each have a WLAN transceiver that can establish a Wi-Fi connection to the wireless access point 215-a. To coordinate live event augmentation activities, the central server computer system 205-a may communicate with the individual beverage containers 100 to control the respective electronic displays 115 integrated into each beverage container 100 and display information related to the event.

In the embodiment shown in FIG. 3, the system 300 may provide for the central server computer system 205-a to access a user account associated with each of the beverage containers 100 at the event. For example, detection of the beverage container 100 at the event may include detection of a unique identification (ID) code associated with each of the beverage containers 100. The central server computer system 205-a may utilize the ID code associated with the beverage container 100 to determine and access a user account associated with that beverage container 100. In some examples, the user account may be an online social network user account (e.g., a Facebook account, a Twitter account, a Linkedin account, etc.). The user account may, in some examples, include information stored in a local database. In some examples, the information stored in a local database may be retrieved from an online social network user account and/or stored based on previous activity associated with the beverage container.

The central server computer system 205-a may determine, based on the user account information, various information related to the user associated with the beverage container 100. For example, the central server computer system may determine which team the user supports, the frequency that the user attends similar or different events, the user's age, the user's gender, the user's nationality, the user's language, etc.

Utilizing such information, the system 300 may provide for the central server computer system 205-a to divide the beverage containers 100 into one or more groups. The central server computer system 205-a may cause different messages to be sent to the beverage containers of different groups such that the information being displayed on the beverage containers 100 of a first group is different than the information being displayed on the beverage containers 100 of a second group. In the example discussed above where the event is a sporting event, the central server computer system 205-a may determine, based on information retrieved from the user accounts associated with each beverage container 100, which team a user of the beverage container 100 supports. In the example shown in FIG. 3, the central server computer system 205-a has divided beverage containers 100-f, 100-g, and 100-i into a first group and beverage containers 100-h and 100-j into a second group based on information retrieved from the associated user accounts. When a first team receives a favorable call from a referee, the central server computer system 205-a may send a first message to the beverage containers 100 of the first group to display a first text or graphic (e.g., "Good Call!"). The central server computer system 205-a may send a second message to the beverage containers 100 of the second group to display a second text or graphic (e.g., "Bad Call!"). As can be appreciated, the central server computer system 205-a may divide the beverage containers 100 into one or more groups based on gender, age, nationality, language, team allegiance, other profile information, etc. As such, different messages can be displayed on the beverage containers 100 from each group.

It is to be understood that the central server computer system 205-a may divide the beverage containers 100 into multiple groups such that a given beverage container 100 may belong to more than one group, e.g., a supporter of a first team group and a Spanish language group. Moreover, the central server computer system 205-a may divide the beverage containers 100 into different groups during the course of an event based on different triggering events. That is, the central server computer system 205-a may create an ad hoc group of associated beverage containers 100 based on receipt of a specific piece of extrinsic data associated with such beverage containers 100. As such, it can be appreciated that a beverage container 100 at an event may, over the course of an event, be associated with different groups based on one or more related activities of extrinsic data.

Figure 4:
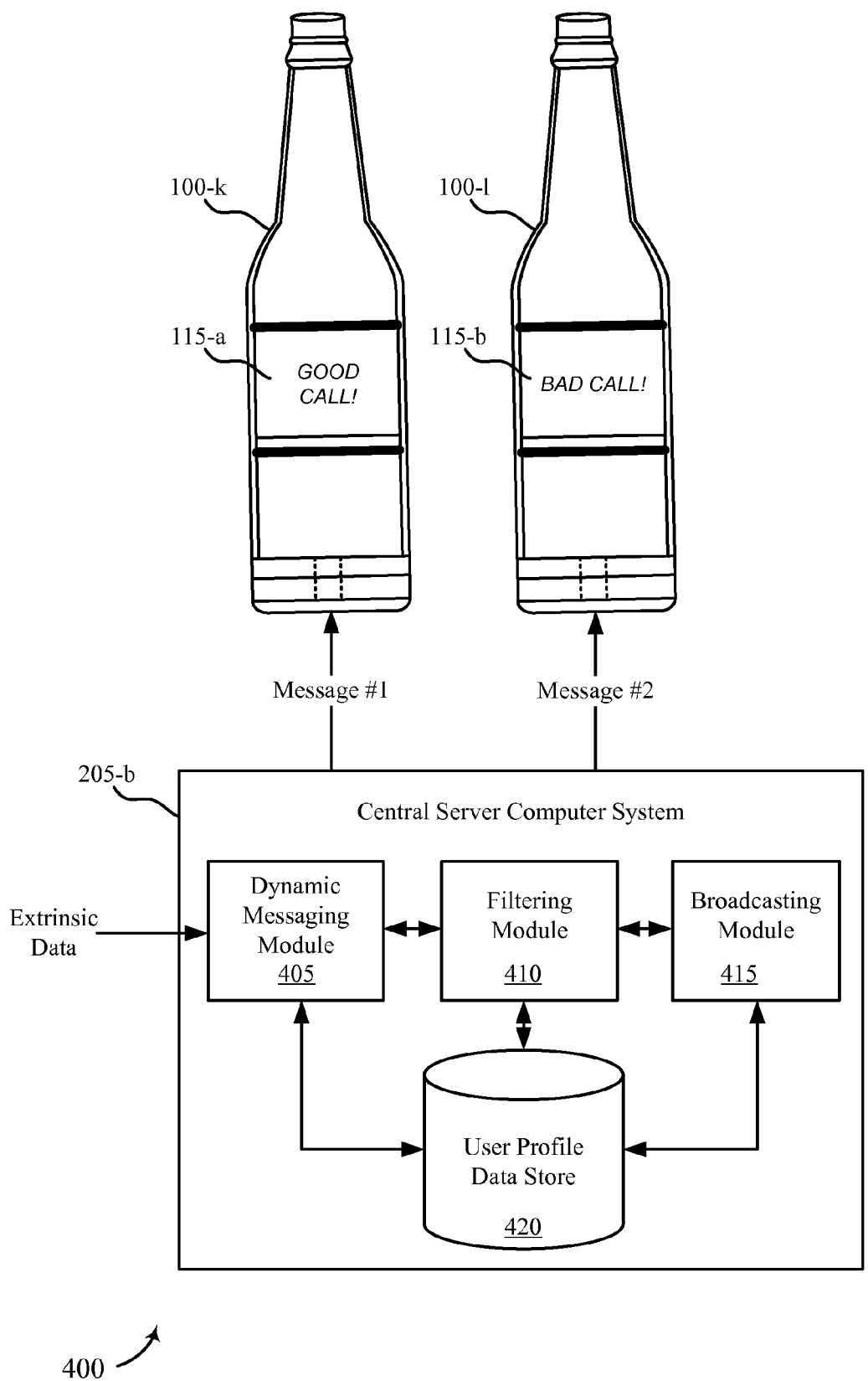
FIG. 4 is a diagram illustrating another example centrally coordinated live event augmentation system communicating with intelligent beverage containers according to various embodiments of the invention.

FIG. 4 is a diagram of another example system 400 for coordinating and implementing an example live event augmentation activity using a central server computer system 205-b. The system 400 may include a central server computer system 205-b communicatively coupled with a number of intelligent beverage containers 100. The system 400 may be an example of the systems 200, and 300 described above with reference to FIGS. 2-3. The beverage containers 100 of the present example may be examples of the beverage containers 100 described above with reference to previous Figures.

In the present example, the central server computer system 205-b may be configured to provide dynamic messages (e.g., text, images, video, or other content) to beverage containers 100 detected at the event. The dynamic messages may be in response to real-time occurrences. For example, returning to the example of a sporting event, a number of beverage container 100 users may be dispersed throughout a stadium or other arena for the sporting event. As events progress in the sporting event, the central server computer system may receive extrinsic data related to the progression of the sporting event and dynamically generate instant replays, related photographs, text commentary or other messages related to the progression of the sporting event. These messages may be transmitted by the central server computer system 205-b to one or more participating beverage containers 100.

Some messages may be broadcast to all known beverage containers 100 at the event. Additionally or alternatively, the same extrinsic event or data may trigger the transmission of different dynamic messages to different beverage containers 100. For example, as shown in FIG. 4, the user of beverage container 100-k may be a fan of a first team, and the user of beverage container 100-1 may be a fan of a second team opposing the first team. As such, when a controversial referee call arises, the central server computer system 205-b may transmit a message supporting the call to beverage container 100-k and a message opposing the call to beverage container 100-1.

To implement this functionality, the central server computer system 205-b may include a dynamic messaging module 405, a filtering module 410, a broadcasting module 415, and a user profile data store 420. Each of the modules 405, 410, 415 and the user profile data store 420 may be implemented by special-purpose software running on one or more processors of the central server computer system 205-b.

The dynamic messaging module 405 may be configured to receive extrinsic data and generate messages related to the extrinsic data. In the present example, the dynamic messaging module 405 may receive extrinsic data related to the controversial referee call and generate separate messages supporting and opposing the call based on the received extrinsic data.

A user profile data store 420 may associate known beverage containers 100 with information about their respective users. For example, the user profile data store 420 may associate the user of beverage container 100-k with the first team and the user of beverage container 100-1 with the second team. The filtering module 410 may access a user profile data store 420 to determine which of the generated messages are appropriate for different beverage container 100 users based on known attributes of the users. In the present example, the filtering module 410 may determine from the user profile data store 420 that the message supporting the controversial referee call is appropriate for the user of beverage container 100-k and the message opposing the controversial referee call is appropriate for the user of beverage container 100-1.

A broadcasting module 415 may transmit the filtered messages to their intended recipients. In the present example, the broadcasting module 415 may transmit the message supporting the controversial referee call to all known beverage containers 100 associated with users known to support the first team and transmit the message opposing the call to all known beverage containers 100 associated with users that are known supporters of the second team.

Figure 5:
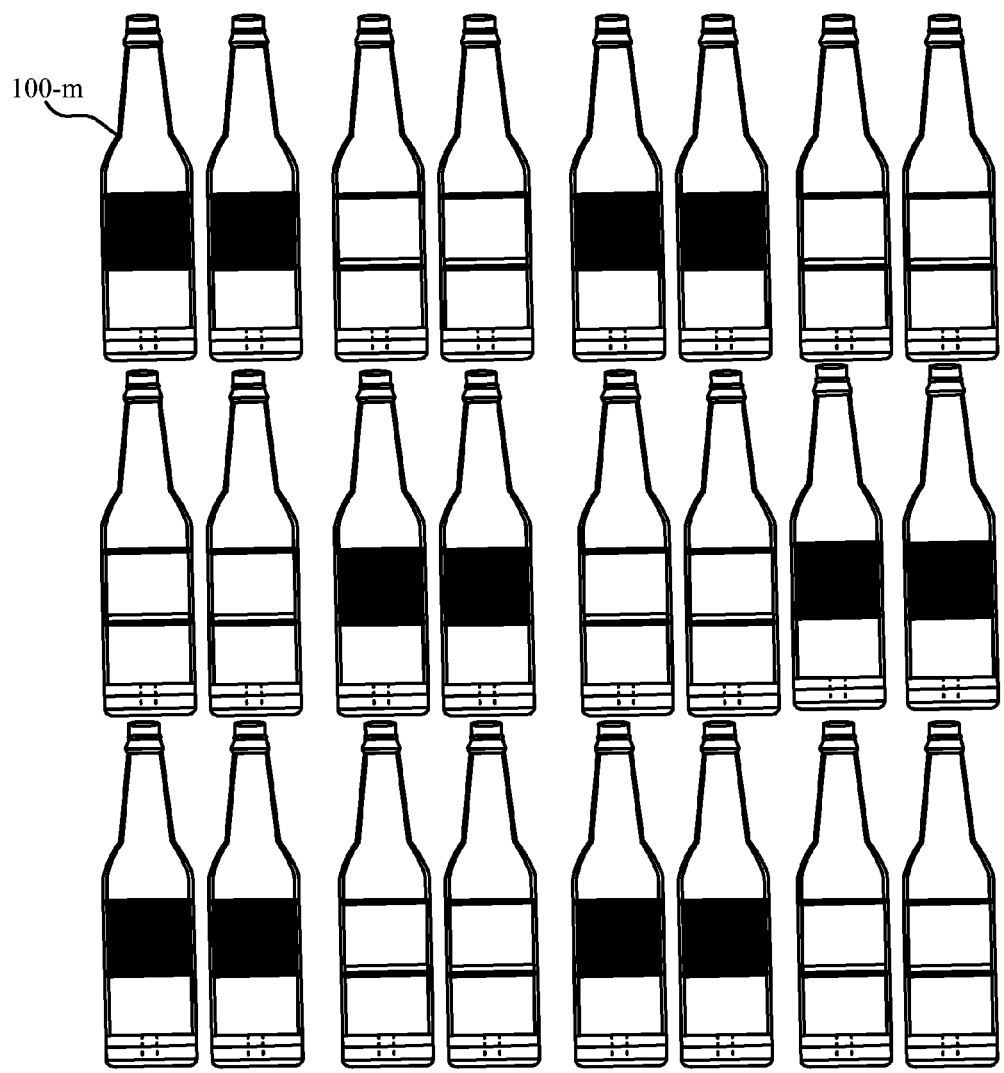
FIG. 5 is a diagram illustrating another example centrally coordinated live event augmentation system communicating with intelligent beverage containers according to various embodiments of the invention.
Figure 5:
Figure 5:
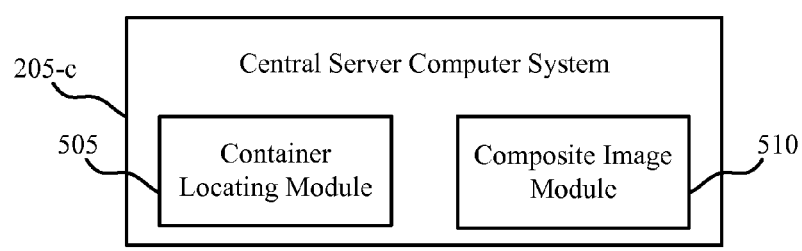

FIG. 5 is a diagram of another example system 500 for coordinating and implementing an example live event augmentation activity using a central server computer system 205-c. The system 500 may include a central server computer system 205-c communicatively coupled with a number of intelligent beverage containers 100. The system 500 may be an example of the systems 200, 300, and/or 400 described above with reference to FIGS. 2-4. The beverage containers 100 of the present example may be examples of the beverage containers 100 described above with reference to previous Figures.

In the present example, the central server computer system 205-c may control the integrated electronic display 115 of each beverage containers 100 at the event to create a composite display. As shown in FIG. 5, the central server computer system 205-c may control the integrated electronic displays 115 of the beverage containers 100 to display a checkerboard pattern. In alternative examples, the beverage containers 100 may be controlled to display a more complex composite image, such as a flag or a team logo. Returning to the example of a sporting event, a number of fans of a certain team may be seated in an area of a stadium, and each fan may be in possession of a participating beverage container 100. The fans may be prompted to hold up their beverage containers 100 such that a composite image of the team logo is displayed to other audience members. In additional or alternative examples, the beverage containers 100 may be controlled to display a moving image, such as an electronic version of "the wave."

To accomplish this functionality, the central server computer system 205-c may include a container locating module 505 and a composite image module 510. The container locating module 505 may associate each participating beverage container 100 with a physical location. In certain examples, the physical location of the beverage container 100 may be absolute. Additionally or alternatively, the physical location may be relative to other beverage containers 100. The physical location of each participating beverage container 100 may be ascertained based on input from integrated beverage container sensors (e.g., RFID sensors) and/or other input (e.g., identification of neighboring beverage containers, communication with external sensors having known locations, etc.). The composite image module 510 may generate the composite image and determine which portion of the composite image is to be displayed by each participating beverage container 100 based on the known locations of the participating beverage containers 100. The composite image module 510 may communicate with the beverage containers 100 to control the integrated displays of the participating beverage containers 100 to display the composite image.

Figure 6:
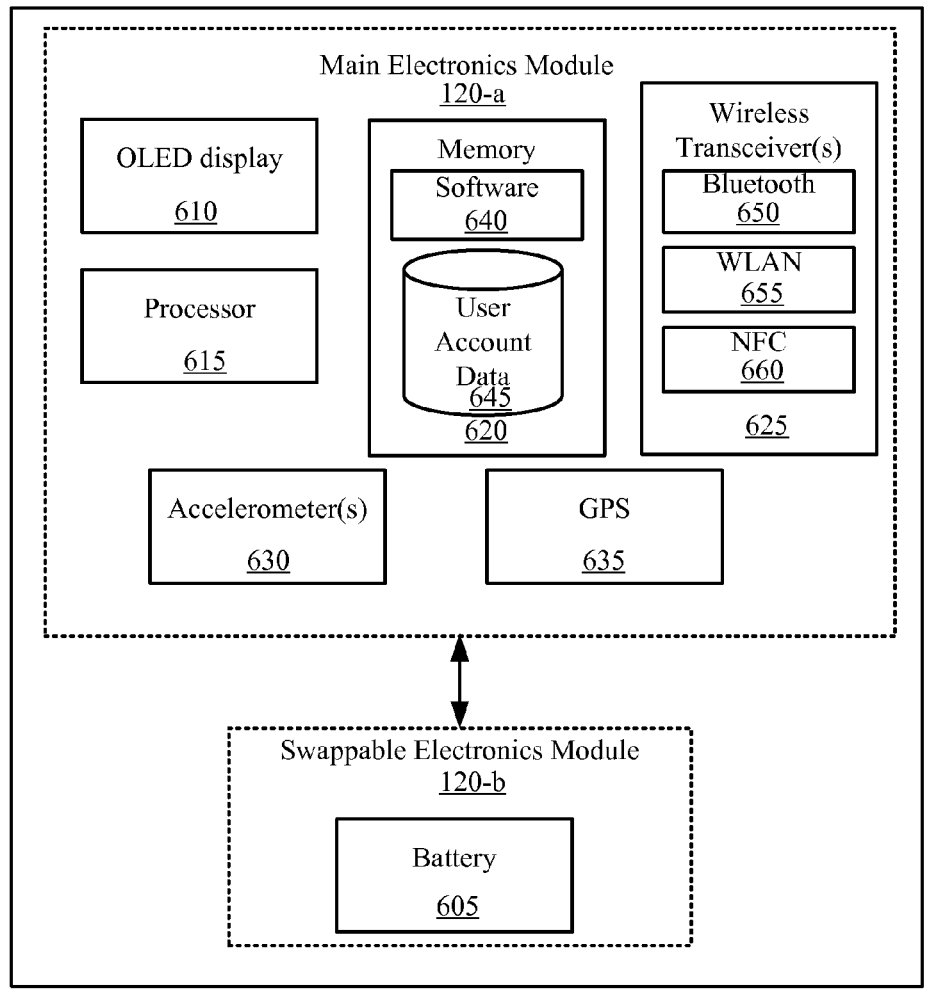
FIG. 6 is a block diagram of an example beverage container configured according to various embodiments of the invention.

FIG. 6 is a block diagram of an example intelligent beverage container 100-n. The beverage container 100-n of the present example may be an example of the beverage containers 100 described above with respect to the previous Figures. The beverage container 100-n of the present example may include a main electronics module 120-a and a swappable electronics module 120-b in communication with each other. The main electronics module 120-a may include circuitry implementing a number of electronic components that are permanently associated with the beverage container 100-n. The swappable electronics module 120-b may include circuitry implementing a number of electronic components that can be interchangeably associated with different beverage containers 100. While the example of FIG. 6 shows only a battery 605 in the swappable electronics module 120-b and all other electronic components in the main electronics module 120-a, each of the electronic components shown in FIG. 6 may be implemented by either the main electronics module 120-a or the swappable electronics module 120-b. In still other examples, only a main electronics module 120-a or a swappable electronics module 120-b may be used to implement all of the electronic components for a beverage container 100-n.

In the present example, the main electronics module 120-a may include an OLED display 610 integrated into the beverage container 100-j as described above with respect to FIG. 1. Alternatively, the beverage container 100-n may include another type of flexible or curved electronic display. The main electronics module 120-a may further include a processor 615 and a memory 620. The processor 615 may execute software 640 stored on the memory 620 to control the OLED display 610, track data about the use of the beverage container, implement live event augmentation activities, and the like. The memory 620 may store user account data 645 containing information other data for communicating with a central server computer system or other beverage containers 100 to implement live event augmentation activities among a number of beverage containers 100. The wireless transceiver(s) 625 may include one or more of a Bluetooth transceiver 650, a WLAN transceiver 655, an NFC transceiver 660, or other types of transceivers that may suit a particular application of the principles of this disclosure.

The main electronics module 120-a may further include one or more accelerometers 630 to detect movement of the bottle, a GPS module 635 to detect location, and/or other types of sensors or input devices. The processor 615 may receive input from these devices and take action based on the input. Additionally or alternatively, the processor 615 may report the input to a network server and receive instructions from the network server based on the input.

Figure 7:
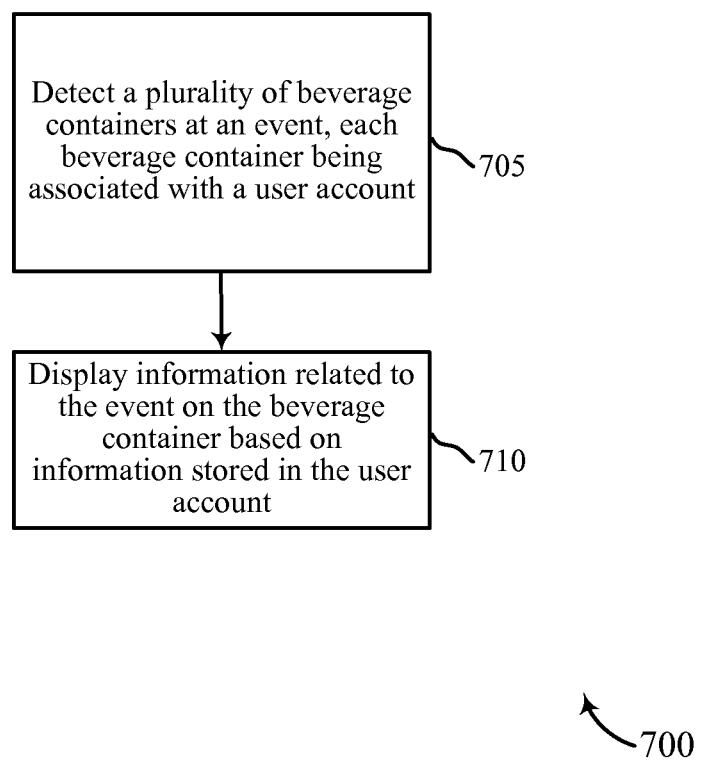
FIG. 7 is a flowchart diagram of an example method for live event augmentation according to various embodiments of the invention.

FIG. 7 is a flowchart of a method 700 for live event augmentation in accordance with aspects of the present disclosure. Aspects of the method 700 may be performed by one or more of the systems 200, 300, 400, and/or 500 of FIGS. 2-5 and/or the beverage container 100-n of FIG. 6. In one implementation, the central server computer system may execute one or more sets of codes or computer executable instructions to control the functional elements of the systems 200, 300, 400, and/or 500, to perform aspects of the functions described below. In another implementation, the electronics module 120 of the beverage containers 100 may execute one or more sets of codes or computer executable instructions to control the functional elements of the beverage container 100 to perform aspects of the functions described below.

At block 705, a plurality of beverage containers 100 may be detected at an event. Each of the beverage containers may be associated with a user account. The beverage containers 100 may be detected at the event by a central server computer system via a wireless signal communicated between the beverage containers 100 and the central server computer system.

The central server computer system may retrieve data from the user accounts associated with each beverage container 100.

At block 710, information related to the event may be displayed on the electronic display 115 of the beverage containers 100. The displayed information may be based on information retrieved from the associated user account and/or on received extrinsic data. According to certain examples, the central server computer system may display the same information on each beverage container 100. In other examples, the central server computer system may display the same information on each beverage container 100, but in a different language, based on information retrieved from the user accounts associated with each beverage container.

Figure 8:
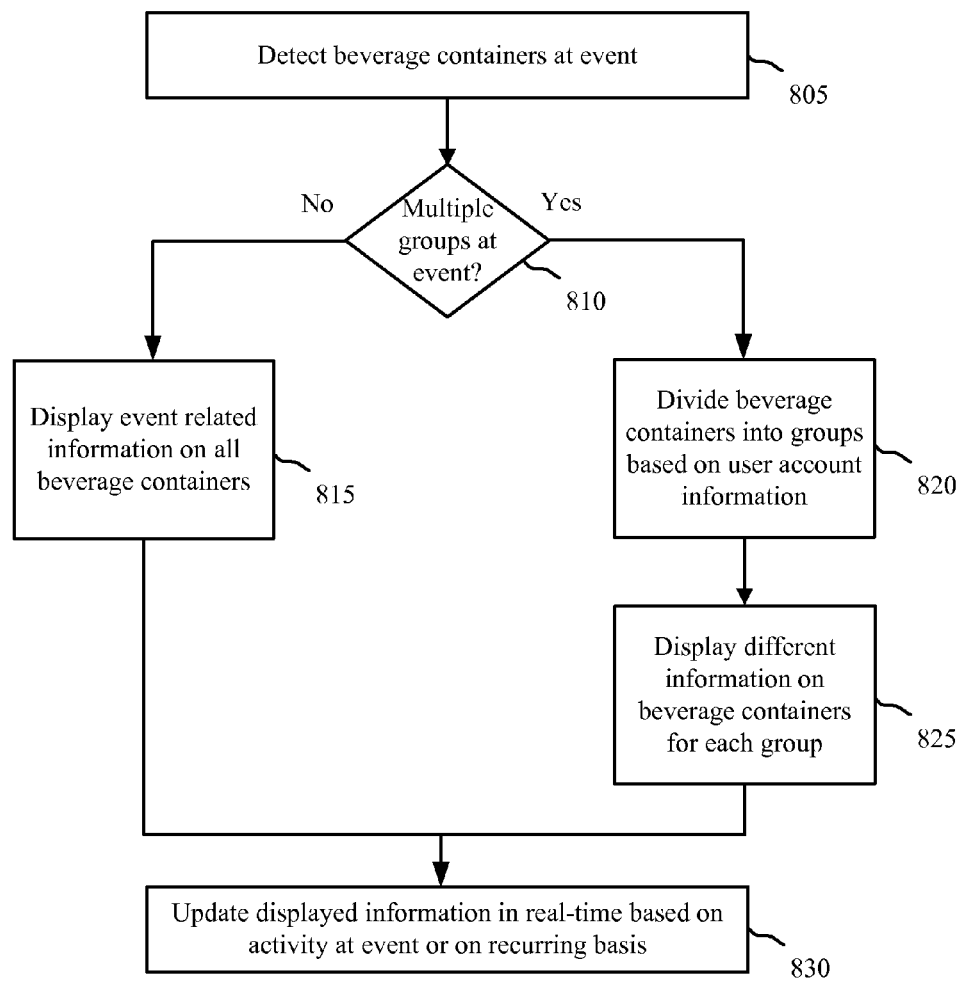
FIG. 8 is a flowchart diagram of an example method for live event augmentation according to various embodiments of the invention.

FIG. 8 is a flowchart of a method 800 for live event augmentation in accordance with aspects of the present disclosure. Aspects of the method 800 may be performed by one or more of the systems 200, 300, 400, and/or 500 of FIGS. 2-5. In one implementation, the central server computer system may execute one or more sets of codes or computer executable instructions to control the functional elements of the systems 200, 300, 400, and/or 500, to perform certain aspects of the functions described below. In another implementation, the electronics module 120 of the beverage containers 100 may execute one or more sets of codes or computer executable instructions to control the functional elements of the beverage container 100 to perform certain aspects of the functions described below.

At block 805, beverage containers 100 may be detected at an event. The beverage containers 100 may be detected at the event by a central server computer system via a wireless signal communicated between the beverage containers 100 and the central server computer system. The central server computer system may retrieve data from the user accounts associated with each beverage container 100. According to certain examples, the wireless signal may be a WiFi signal between the beverage containers 100 and the central server computer system. In other examples, the wireless signals may be an RFID signal wherein a RFID reader communicates the received ID number associated with each beverage container 100 to the central server computer system.

At block 810, the central server computer system may determine if multiple groups are at the event. As discussed above, each of the beverage containers 100 may be associated with a user account. The central server computer system may retrieve information from the user accounts of the detected beverage containers 100 at the event to determine if beverage containers 100 should be divided into different groups. By way of example only, the central server computer system may divide the beverage containers 100 into one or more groups based on allegiance to a particular team, language, age, gender, nationality, previous activities, purchase history associated with the user of the beverage container 100, and the like.

At block 815, where the central server computer system determines that there are not multiple groups at the event, information related to the event may be displayed on all of the beverage containers 100 at the event. During the course of the event, the displayed information on the beverage containers 100 may be changed according to activities occurring at the event. Extrinsic data related to the event may be received and used to generate display messages sent to the beverage containers 100.

At block 820, where the central server computer system determines there are multiple groups at the event, the beverage containers 100 may be divided into groups based on user account information. As discussed, certain beverage containers 100 may be associated with a first group based on a common allegiance to a first team and a second group based on a common allegiance to a second team. Other groups may be based on the nationality and/or language of the users of the beverage containers 100. At block 825, different information may be displayed on the beverage containers 100 for each group.

At block 830, the information being displayed on the beverage containers 100 may be updated in real-time. The central server computer system may receive extrinsic information during the course of the event and update the displays on the beverage containers 100 based on the extrinsic data. The extrinsic data may be based on activities occurring during the event and related to the event (e.g., a score, a penalty, a halftime, an intermission, a different group taking the stage, etc.). In some examples, the extrinsic information may be based on activities occurring during the event but not related to the event (e.g., real world breaking news updates, weather information for the surrounding location, scores from different sporting events, etc.). As previously discussed, the central server computer system may update the information being displayed on the beverage containers 100 in real-time based on the extrinsic data as well as the information retrieved from the user accounts associated with each beverage container 100. For example, the central server computer system may receive extrinsic data indicating breaking story at a particular city, retrieve information from the user accounts to determine which beverage containers 100 are associated with users from that city, and display information indicative of the breaking story on the beverage containers 100 associated with those users.

Figure 9:
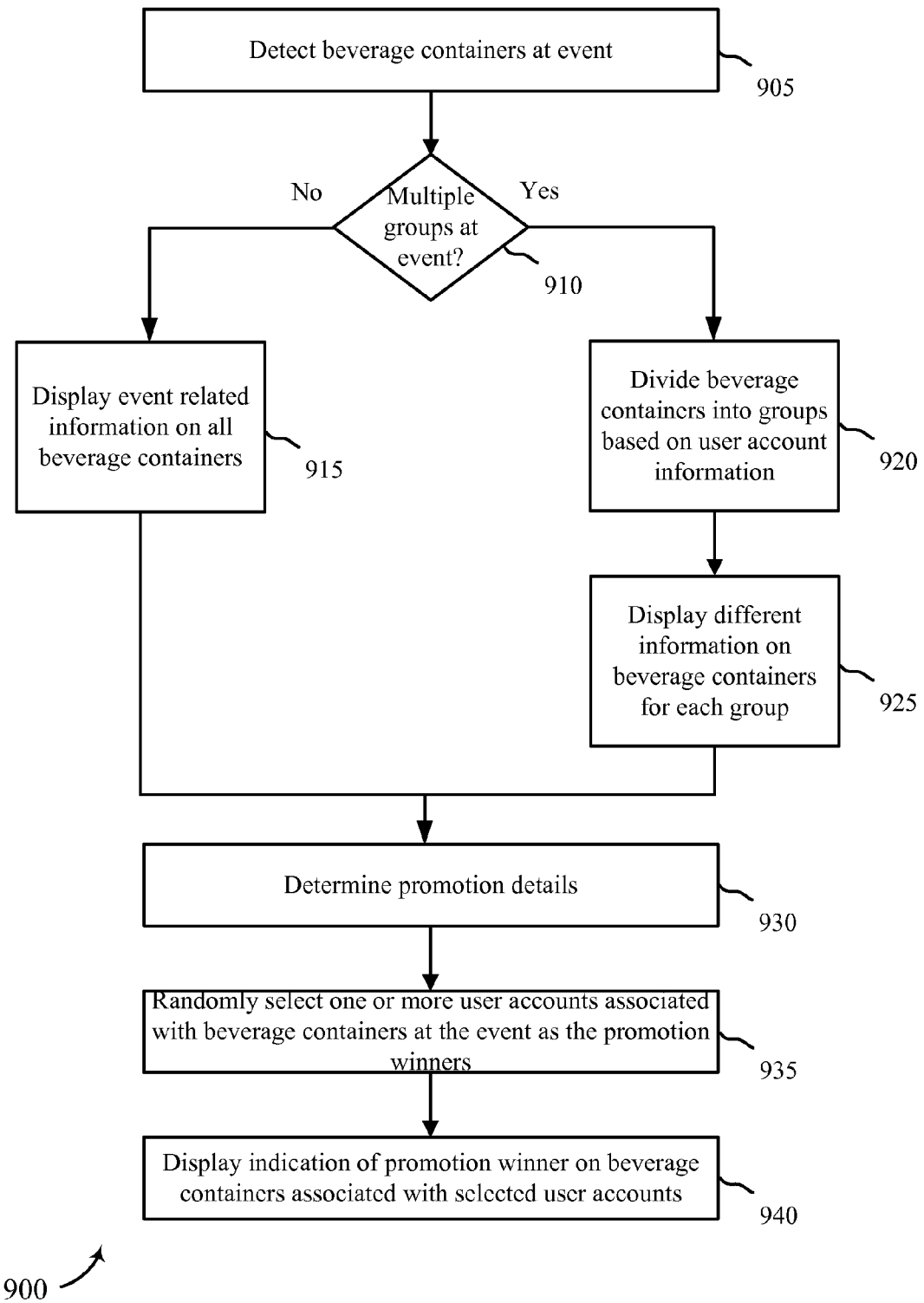
FIG. 9 is a flowchart diagram of an example method for live event augmentation according to various embodiments of the invention.

FIG. 9 is a flowchart of a method 900 for live event augmentation in accordance with aspects of the present disclosure. Aspects of the method 900 may be performed by one or more of the systems 200, 300, 400, and/or 500 of FIGS. 2-5. In one implementation, the central server computer system may execute one or more sets of codes or computer executable instructions to control the functional elements of the systems 200, 300, 400, and/or 500, to perform certain aspects of the functions described below. In another implementation, the electronics module 120 of the beverage containers 100 may execute one or more sets of codes or computer executable instructions to control the functional elements of the beverage container 100 to perform certain aspects of the functions described below.

At block 905, beverage containers 100 may be detected at an event. The beverage containers 100 may be detected at the event by a central server computer system via a wireless signal communicated between the beverage containers 100 and the central server computer system. The central server computer system may retrieve data from the user accounts associated with each beverage container 100. At block 910, the central server computer system may determine if multiple groups are at the event. As discussed above, each of the beverage containers 100 may be associated with a user account. The central server computer system may retrieve information from the user accounts of the detected beverage containers 100 at the event to determine if the beverage containers 100 should be divided into different groups.

At block 915, where the central server computer system determines that there are not multiple groups at the event, information related to the event may be displayed on all of the beverage containers 100 at the event. During the course of the event, the displayed information on the beverage containers 100 may be changed according to activities occurring at the event.

At block 920, where the central server computer system determines there are multiple groups at the event, the beverage containers 100 may be divided into groups based on user account information. As discussed in the example above, certain beverage containers 100 may be associated with a first group based on a common allegiance to a first team and a second group based on a common allegiance to a second team. Other groups may be based on the nationality and/or spoken language of the users of the beverage containers 100. At block 925, different information may be displayed on the beverage containers 100 for each group.

At block 930, a central server computer system may determine details related to a promotion to be held at the event. The promotion may be a prize giveaway, selection of a fan to be moved to better seat, etc. At block 935, the central server computer system may randomly select one or more user accounts associated with beverage containers 100 at the event as the promotion winner(s). The selected winners may be randomly selected from all beverage containers 100 at the event, from a particular group of associated beverage containers, and the like. At block 940, the display on the beverage container 100 of the selected promotion winner(s) may be changed to indicate that user has won the promotion. The display may be updated to show a text message, graphic display, to a particular color, etc., to indicate that the user is a promotion winner. In one example, the central server computer system may change all of the displays on the beverage containers at the event to a first color and then change the promotion winner displays to a second color to indicate they are the winners.

Figure 10:
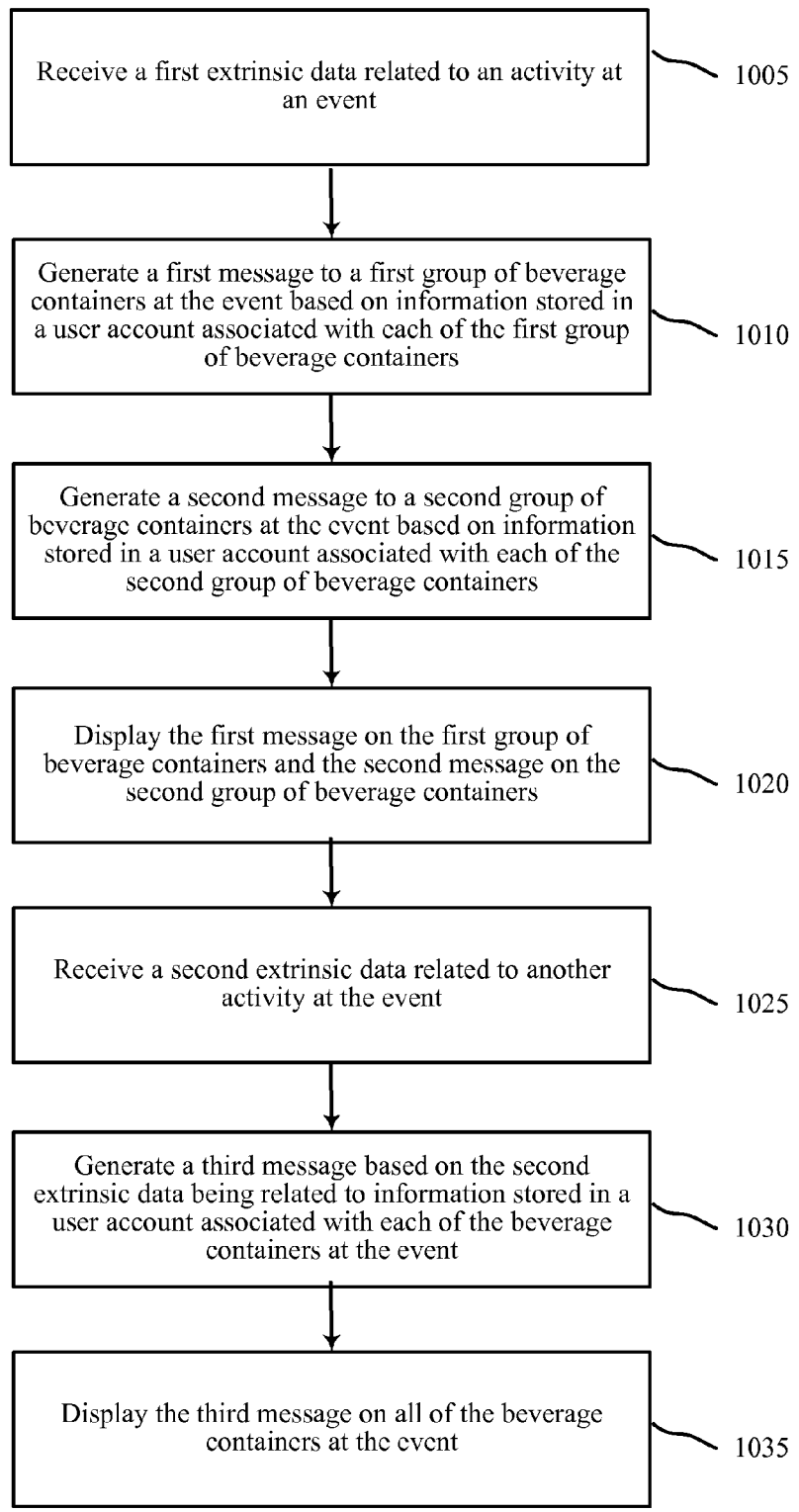
FIG. 10 is a flowchart diagram of an example method for live event augmentation according to various embodiments of the invention.

FIG. 10 is a flowchart of a method 1000 for live event augmentation in accordance with aspects of the present disclosure. Aspects of the method 1000 may be performed by one or more of the systems 200, 300, 400, and/or 500 of FIGS. 2-5. In one implementation, the central server computer system may execute one or more sets of codes or computer executable instructions to control the functional elements of the systems 200, 300, 400, and/or 500, to perform certain aspects of the functions described below. In another implementation, the electronics module 120 of the beverage containers 100 may execute one or more sets of codes or computer executable instructions to control the functional elements of the beverage container 100 to perform certain aspects of the functions described below.

At block 1005, a central server computer system may receive a first extrinsic data related to an activity at an event. Exemplary extrinsic data may include, but is not limited to, a first team scoring, a halftime of the event, a different song being performed at the event, and the like. At block 1010, the central server computer system may generate a first message to a first group of beverage containers at the event based on information stored in a user account associated with each of the first group of beverage containers. At block 1015, the central server computer system may generate a second message to a second group of beverage containers at the event based on information stored in a user account associated with each of the second group of beverage containers. The first and second messages may be different based on the information stored in the user account of beverage containers 100 from the first and second groups. At block 1020, the first message may be displayed on the first group of beverage containers and the second message may be displayed on the second group of beverage containers.

At block 1025, the central server computer system may receive a second extrinsic data related to another activity at the event. The second extrinsic data may be related to each of the beverage containers 100 at the event. Accordingly, at block 1030 the central server computer system may generate a third message based on the second extrinsic data being related to information stored in a user account associated with each of the beverage containers at the event. At block 1035, the third message may be displayed on all of the beverage containers at the event.

Figure 11:
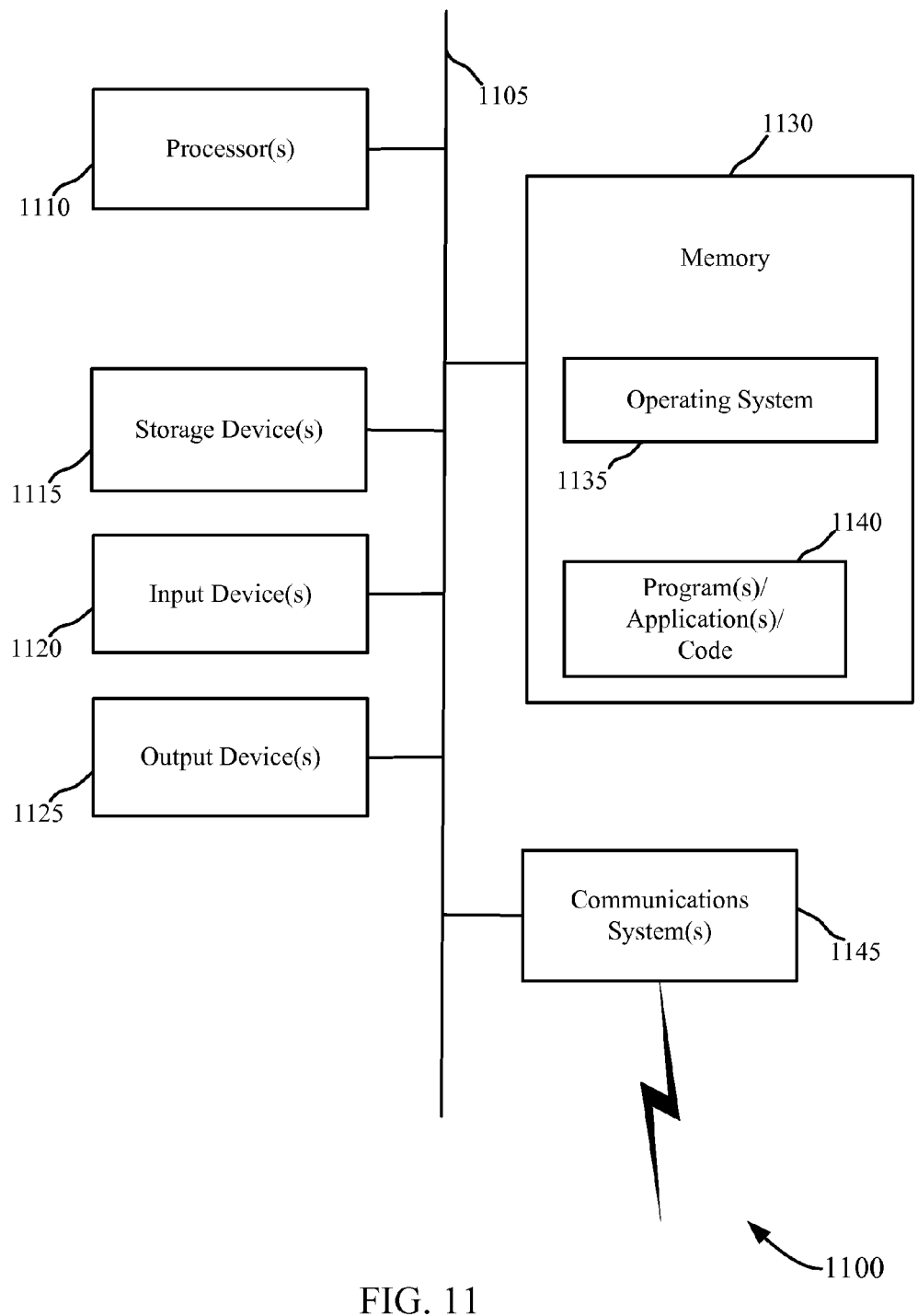
FIG. 11 is a schematic diagram that illustrates a representative device structure that may be used in various embodiments of the present invention.

A device structure 1100 that may be used for a beverage container 100, a central server computer system 205, or other computing devices described herein, is illustrated with the schematic diagram of FIG. 11. This drawing broadly illustrates how individual system elements of each of the aforementioned devices may be implemented, whether in a separated or more integrated manner. The exemplary structure is shown comprised of hardware elements that are electrically coupled via bus 1105, including processor(s) 1110 (which may further comprise a DSP or special-purpose processor), storage device(s) 1115, input device(s) 1120, and output device(s) 1125. The storage device(s) 1115 may be a machine-readable storage media reader connected to any machine-readable storage medium, the combination comprehensively representing remote, local, fixed, or removable storage devices or storage media for temporarily or more permanently containing computer-readable information. The communications systems interface 1145 may interface to a wired, wireless, or other type of interfacing connection that permits data to be exchanged with other devices. The communications system(s) interface 1145 may permit data to be exchanged with a network.

The structure 1100 may also include additional software elements, shown as being currently located within working memory 1130, including an operating system 1135 and other code 1140, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

These components may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details.

For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a SIM card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method comprising:
   detecting, at a computing device, a plurality of beverage containers at a sporting event between at least two teams, each beverage container being associated with a user account;
   determining, based on information stored in the user accounts, which team each user of one of the beverage containers supports;
   dividing, based on the determination, at least a portion of the beverage containers at the event into a group that supports at least one of the at least two teams;
   displaying information related to the event on the beverage containers based on information stored in the user accounts; and
   updating the information displayed on the beverage containers in real-time based on activities occurring at the event.

2. The method of claim 1, wherein the dividing comprises dividing the plurality of beverage containers into a first group supporting a first one of the teams and a second group supporting a second one of the teams, the method further comprising:
   displaying different information on the beverage containers associated with the first group than is displayed on the beverage containers associated with the second group at the event.

3. The method of claim 1, further comprising:
   changing the displayed information on the beverage containers at the event on a recurring basis based on a predetermined time period.

4. The method of claim 1, wherein different information is displayed on at least a portion of the beverage containers at the event.

5. The method of claim 1, further comprising:
   displaying information related to the event on the beverage containers in different languages based on information stored in the user accounts associated with the beverage container.

6. The method of claim 1, further comprising:
   initiating a prize giveaway in conjunction with the event;
   randomly selecting a beverage container detected at the event as a winner of the prize giveaway; and
   displaying information on the selected beverage container indicating that the user of the beverage container is the winner of the prize giveaway.

7. The method of claim 1, wherein detecting the plurality of beverage containers at the event comprises detecting a wireless signal from each of the beverage containers.

8. The method of claim 7, wherein the wireless signal is transmitted via a wireless communications module in each of the beverage containers.

9. An apparatus for conducting live event augmentation, comprising:
   a processor;
   memory in electronic communication with the processor; and
   instructions being executable by the processor to,
      detect a plurality of beverage containers at a sporting event between at least two teams, each beverage container being associated with a user account;
      determine, based on information stored in the user accounts, which team each user of one of the beverage containers supports;
      divide, based on the determination, at least a portion of the beverage containers at the event into a group that supports at least one of the at least two teams;
      display information related to the event on the beverage containers based on information stored in the user accounts; and
      update the information displayed on the beverage containers in real-time based on activities occurring at the event.

10. The apparatus of claim 9, wherein the dividing comprises dividing the plurality of beverage containers into a first group supporting a first one of the teams and a second group supporting a second one of the teams, apparatus further comprising instructions to:
    display different information on the beverage containers associated with the first group than is displayed on the beverage containers associated with the second group at the event.

* * * * *